United States Patent
Wu et al.

(10) Patent No.: US 12,549,127 B2
(45) Date of Patent: Feb. 10, 2026

(54) SYSTEM TO DISPLAY A VIVID IMAGE ON SOLAR CELLS HAVING FLEXIBLE PROPERTIES

(71) Applicant: Toyota Motor Engineering & Manufacturing North America, Inc., Plano, TX (US)

(72) Inventors: Songtao Wu, Ann Arbor, MI (US); Debasish Banerjee, Ann Arbor, MI (US); Brian Woods, Brighton, MI (US); Taizo Masuda, Yokohama (JP); Ryota Tomizawa, Susono (JP)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/903,607

(22) Filed: Oct. 1, 2024

(65) Prior Publication Data
US 2025/0112590 A1     Apr. 3, 2025

Related U.S. Application Data

(63) Continuation of application No. 18/477,962, filed on Sep. 29, 2023.

(51) Int. Cl.
*H02S 40/22*     (2014.01)
*G02B 3/00*     (2006.01)
(Continued)

(52) U.S. Cl.
CPC .............. *H02S 40/22* (2014.12); *G02B 3/005* (2013.01); *G02B 19/0009* (2013.01);
(Continued)

(58) Field of Classification Search
CPC ................................. H02S 40/22; H02S 20/26
See application file for complete search history.

(56) References Cited

U.S. PATENT DOCUMENTS

| 3,264,707 A | 8/1966 | Elie |
| 4,414,316 A | 11/1983 | Conley |

(Continued)

FOREIGN PATENT DOCUMENTS

| CN | 102412322 A | 4/2012 |
| CN | 113097322 B | 8/2022 |

(Continued)

OTHER PUBLICATIONS

Motorward, "2018 Lexus LC Structural Blue Explained," 3 pages, Dec. 6, 2017, found at https://www.youtube.com/watch?v=wH0FqlYOhFU.

(Continued)

*Primary Examiner* — Jayne L Mershon
(74) *Attorney, Agent, or Firm* — Christopher G. Darrow; Darrow Mustafa PC

(57) ABSTRACT

Systems herein relate to a device having a lens that directs angles of light toward solar cells and display sections having components that improve image clarity, reflectivity, and vividness. In one embodiment, a system includes a lens that directs incident light within a first angular range for absorption and a second angular range toward viewing material. The system also includes that the viewing material is within sections of the lens and forms an image. The system also includes reflective components adjacent to the viewing material within the sections of the lens, the reflective components reach ends of the lens away from the incident light and reflect the incident light within the second angular range that reflects off the viewing material. The system also includes an absorption component that captures energy from (Continued)

the incident light, the absorption component coupled to the lens at the ends and the reflective components.

20 Claims, 6 Drawing Sheets

(51) Int. Cl.
   *G02B 19/00* (2006.01)
   *H02S 20/26* (2014.01)
   *H02S 40/38* (2014.01)
(52) U.S. Cl.
   CPC .......... *G02B 19/0042* (2013.01); *H02S 20/26* (2014.12); *H02S 40/38* (2014.12)

(56) References Cited

U.S. PATENT DOCUMENTS

| | | |
|---|---|---|
| 5,011,544 A | 4/1991 | Gaddy et al. |
| 5,303,525 A | 4/1994 | Magee |
| 5,782,994 A | 7/1998 | Mori et al. |
| 6,724,636 B2 | 4/2004 | Yamamoto et al. |
| 7,971,377 B2 | 7/2011 | Zheng |
| 8,264,775 B2 | 9/2012 | Gilbert |
| 8,338,693 B2 | 12/2012 | Raymond et al. |
| 8,404,967 B2 | 3/2013 | Kalkanoglu et al. |
| 8,486,494 B2 | 7/2013 | Fukazawa et al. |
| 8,632,201 B2 | 1/2014 | Gilbert et al. |
| 8,835,751 B2 | 9/2014 | Kalkanoglu et al. |
| 9,276,141 B2 | 3/2016 | Kalkanoglu et al. |
| 9,716,197 B2 | 7/2017 | Kerzabi |
| 9,761,643 B2 | 9/2017 | Sagardoyburu |
| 9,831,367 B2 | 11/2017 | Huang et al. |
| 10,256,358 B2 | 4/2019 | Gilbert |
| 10,256,360 B2 | 4/2019 | Balasubramanian et al. |
| 10,418,501 B2 | 9/2019 | Fisher et al. |
| 10,439,090 B2 | 10/2019 | Lunt et al. |
| 10,727,358 B2 | 7/2020 | Ballif et al. |
| 10,727,363 B2 | 7/2020 | Balasubramanian et al. |
| 10,937,915 B2 | 3/2021 | Pilliod et al. |
| 10,948,734 B2 | 3/2021 | Ouderkirk et al. |
| 11,012,026 B2 | 5/2021 | Kalkanoglu et al. |
| 11,161,369 B2 | 11/2021 | Occidentale et al. |
| 11,393,942 B2 | 7/2022 | Balasubramanian et al. |
| 11,563,403 B2 | 1/2023 | Onozaki et al. |
| 2004/0017524 A1 | 1/2004 | Li |
| 2005/0140331 A1 | 6/2005 | McQuade |
| 2010/0018569 A1 | 1/2010 | Mitchell et al. |
| 2011/0063729 A1* | 3/2011 | Gilbert .................... F24S 21/00 359/619 |
| 2011/0242664 A1* | 10/2011 | Counil .................. G09F 27/007 359/619 |
| 2012/0247537 A1 | 10/2012 | Mei |
| 2013/0118099 A1 | 5/2013 | Scanlon |
| 2013/0153934 A1 | 6/2013 | Meitl et al. |
| 2014/0290723 A1* | 10/2014 | Gilbert .................... H10F 71/00 136/251 |
| 2015/0034146 A1 | 2/2015 | Wei et al. |
| 2015/0311373 A1 | 10/2015 | Kerzabi et al. |
| 2016/0072430 A1 | 3/2016 | Gilbert et al. |
| 2016/0132163 A1 | 5/2016 | Qiu et al. |
| 2016/0269719 A1 | 9/2016 | Gagliano |
| 2017/0117428 A1 | 4/2017 | Huang |
| 2019/0109248 A1 | 4/2019 | Banerjee et al. |
| 2019/0188875 A1 | 6/2019 | Ludwig |
| 2019/0274432 A1 | 9/2019 | Rawls |
| 2020/0083393 A1 | 3/2020 | Thon et al. |
| 2020/0395886 A1 | 12/2020 | Cramer |
| 2021/0066525 A1 | 3/2021 | Volfson |
| 2021/0265943 A1 | 8/2021 | Severgnini et al. |
| 2022/0140779 A1 | 5/2022 | Shkalim et al. |
| 2023/0116414 A1 | 4/2023 | Huang et al. |

FOREIGN PATENT DOCUMENTS

| | | |
|---|---|---|
| CN | 115044243 A | 9/2022 |
| CN | 116314403 A | 6/2023 |
| DE | 102009025426 A1 | 12/2010 |
| FR | 2896596 A1 | 7/2007 |
| FR | 3004584 A1 | 10/2014 |
| FR | 3020533 A1 | 10/2015 |
| IN | CHE-2007-00111 A | 11/2008 |
| JP | 2014200944 A | 10/2014 |
| JP | 5945552 B2 | 7/2016 |
| JP | 6331476 B2 | 5/2018 |
| JP | 6331478 B2 | 5/2018 |
| JP | 6399288 B2 | 10/2018 |
| JP | 6439912 B2 | 12/2018 |
| JP | 6460305 B2 | 1/2019 |
| KR | 101337158 B1 | 12/2013 |
| KR | 102253483 B1 | 5/2021 |
| KR | 20210126324 A | 10/2021 |
| KR | 20220099943 A | 7/2022 |
| KR | 1020230120095 A | 8/2023 |
| WO | 2009133280 A2 | 11/2009 |
| WO | 2010101811 A1 | 9/2010 |
| WO | 2014167194 A1 | 10/2014 |
| WO | 2014174162 A1 | 10/2014 |
| WO | 2015015063 A1 | 2/2015 |
| WO | 2015040288 A1 | 3/2015 |
| WO | 2023063463 A1 | 4/2023 |

OTHER PUBLICATIONS

International Search Report and Written Opinion, PCT Application No. PCT/US2024/047442, mailed Dec. 18, 2024, 11 pages.

* cited by examiner

SYSTEM TO DISPLAY A VIVID IMAGE ON SOLAR CELLS HAVING FLEXIBLE PROPERTIES

CROSS-REFERENCE TO RELATED APPLICATIONS

This application is a continuation of U.S. patent application Ser. No. 18/477,962, filed on Sep. 29, 2023, which is herein incorporated by reference in its entirety as if fully set forth.

TECHNICAL FIELD

The subject matter described herein relates, in general, to displaying an image on solar cells, and, more particularly, to a system including a lens that directs angles of incident light toward the solar cells and display sections having components that improve image reflectivity and vividness.

BACKGROUND

Systems using solar panels benefit from capturing and harvesting energy for powering devices or storing the energy for future usage. Solar panels have semiconductor material (e.g., silicon) within cells installed in a metal panel with a casing (e.g., glass). The semiconductor material releases electrons and generates an electric charge when exposed to photons of sunlight. Although the photons have limited energy, the electric charge can accumulate rapidly using solar panels that are sizable to power consumer electronics, home lighting, and even appliances. In particular, the electric charge may create a direct current (DC) captured by wiring in solar panels for directly powering devices. The DC may also be converted to alternating current (AC) by an inverter for wall sockets in a building. Regarding output power, the quantity of solar panels and cells impact the building loads and device capacities the system can power.

In various implementations, systems having a sizable array of solar panels for powering a neighborhood, commercial building, etc. encounter difficulties due to poor aesthetics. For example, homeowner associations prohibit solar panels on roofs due to unsightly appearances from bulky and rigid hardware. Similarly, local laws (e.g., zoning) may limit the area used for solar panels and request a permit from an art commission. Accordingly, systems having solar panels for powering buildings may generate insufficient energy due to aesthetic features that limit installing sizable arrays.

SUMMARY

In one embodiment, example systems relate to a device having a lens that directs angles of light toward solar cells and display sections having components that improve image clarity, reflectivity, and vividness. In various implementations, systems using an array of solar panels for powering buildings or devices generate insufficient energy from poor aesthetics that constrain array sizes. Systems that alter the appearance of solar panels can improve aesthetics and allow sizeable arrays. For example, certain solar panels have cells that mimic patterns of roofing material (e.g., tiles) for residential applications. Still, these systems may obstruct solar rays that reduces harvesting efficiency for energy, and display blurred aesthetics from noise caused by the integration of visual materials. Furthermore, the solar panels that mimic roofing material are rigid and unbendable, thereby limiting applications to certain roof shapes.

Therefore, in one embodiment, a system forms an image displayed on material that absorbs solar energy through integrating a lens, viewing material, and reflective components for maintaining harvesting efficiency and exhibiting display clarity. Here, the lens may be a lenticular lens that directs incident light to an absorption component (e.g., solar cells) through transparent portions of the lens for certain angles. The lens directs other angles to the viewing material (e.g., ink, pigment, structural pigment, pixels, etc.) that are made visible through direct irradiation and the incident light bouncing off the reflective components. In one approach, the different angles alter the incident light so that the image (e.g., a black and white image, a color image, etc.) is viewable at certain angles without interfering with absorbing solar rays traveling at other angles. Furthermore, the viewing material (e.g., an advertisement) and the reflective component may be located within sections of the lens that reduce the image and absorption interference. In one approach, the system uses flexible materials and substrates for curved applications (e.g., a dome roof), thereby allowing diverse applications. Accordingly, the system improves aesthetics for solar cells and harvesting efficiency by a lens optimally altering incident light and reflective components within sections of the lens.

In one embodiment, a system having a lens that directs angles of light toward solar cells and display sections having components that improve image clarity, reflectivity, and vividness is disclosed. The system includes a lens that directs incident light within a first angular range for absorption and a second angular range toward viewing material. The system also includes that the viewing material is within sections of the lens and forms an image. The system also includes reflective components adjacent to the viewing material within the sections of the lens, the reflective components reach the ends of the lens away from the incident light and reflect the incident light within the second angular range that reflects off the viewing material. The system also includes an absorption component that captures energy from the incident light, the absorption component coupled to the lens at the ends and the reflective components.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1A:
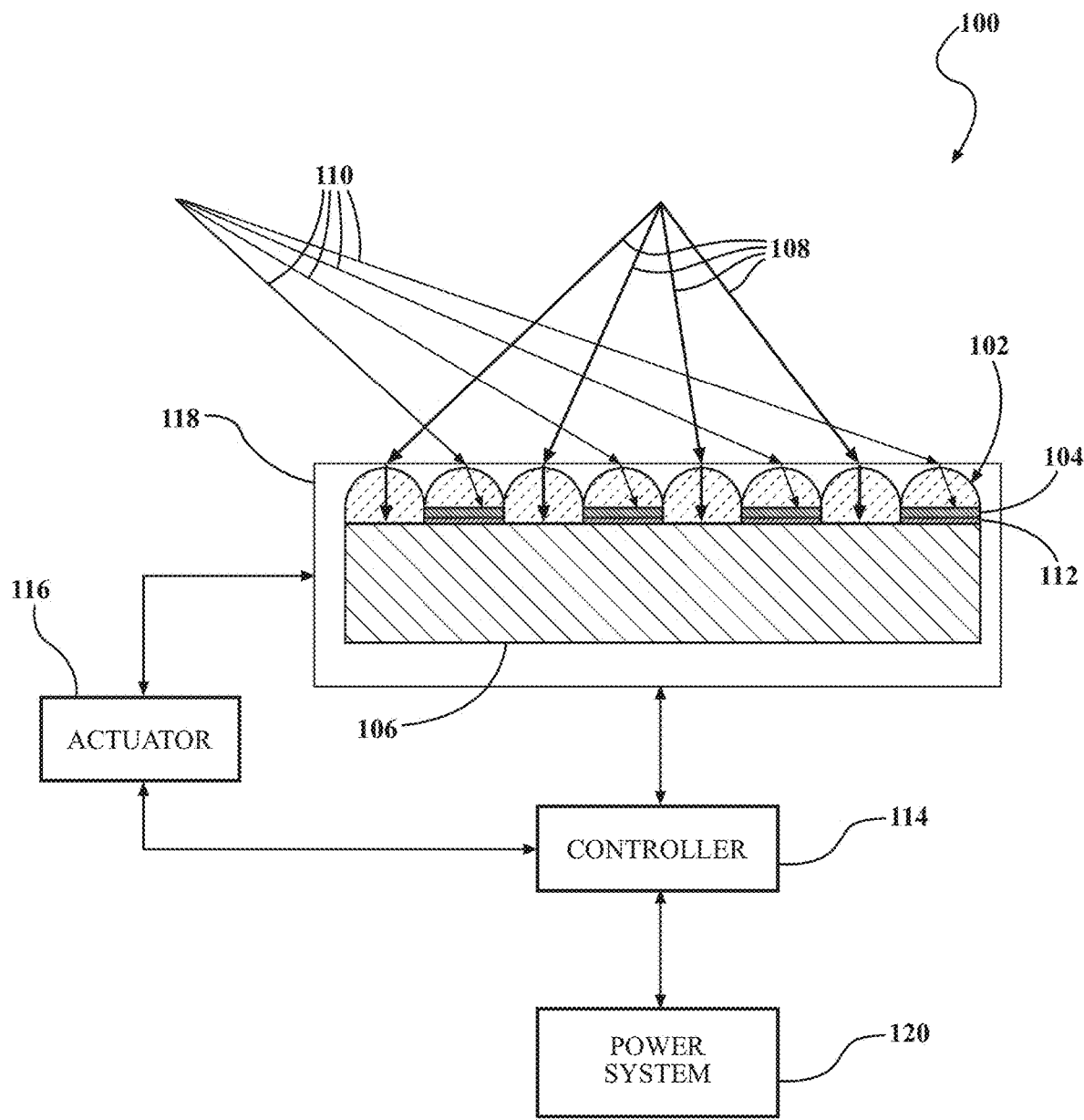
FIGS. 1A, 1B, and 1C illustrate embodiments of a system having a lens that controls angles of light toward material that absorbs solar energy and sections having viewing material and reflective components.

Systems and other embodiments associated with a device having a lens that directs angles of light toward solar cells and display sections having components that improve image clarity, reflectivity, and vividness are disclosed herein. In various implementations, systems powering loads demanding sufficient energy from solar cells encounter difficulties associated with poor aesthetic characteristics. For example, local rules (e.g., a homeowners associations, art commissions, etc.) can constrain areas available for installing solar cells because of the unwanted appearance from such systems. Furthermore, form factors and materials used by solar cells can limit applications to flat surfaces and expansive spaces.

Therefore, in one embodiment, a system displays an image through a lenticular lens that targets incident light at certain angles toward viewing material having sectionalized image parts with reflective material and other angles at solar cells below the image parts, thereby improving aesthetics and harvesting efficiency. Here, the lenticular lens may act as an optical waveguide using acrylic material for superior transparency that juxtaposes the incident light making the image viewable at the certain angles. Through juxtaposition, the image (e.g., a black and white image, a color image, etc.) is viewable within an angular range while otherwise being unviewable and transparent at other angles. Furthermore, the system directly controls solar rays toward the solar cells efficiently by avoiding obstructions to the incident light and preserves displaying the image vividly through controlled reflectivity. In one approach, the lenticular lens improves isolating the incident light among different angles by wrapping the image parts having reflective material until reaching the ends of sections (e.g., surfaces) that are grooves, cavities, etc. associated with the lenticular lens. Thus, the system improves the aesthetics of solar cells by displaying images viewable within certain angles and otherwise directly guiding solar rays toward the solar cells that improves energy capture and sufficiently powers demanding loads.

Moreover, the system may increase image vibrancy using a pigment having structural color within the viewing material. Here, the pigment may include scattered and flaky elements (e.g., titanium dioxide ($TiO_2$), silica, etc.) that promote controlled interference of incident light for tuning to a wavelength (i.e., color). The interference increases and concentrates reflectivity and effectively tunes at a wavelength, thereby displaying a vibrant color. Compared to other pigments, viewing material formed from structured pigments use less material, thereby allowing compact form factors. As an additional improvement, the lenticular lens and the solar cells may be composed of flexible material allowing form factors that are curved. In this way, the system can support installations for surfaces having various shapes that increase the area for energy capture. Therefore, the system displays vivid images and forms shapes that adapt to more surfaces, thereby improving aesthetics and increasing energy capture.

In various implementations, the system includes a controller and actuator that move the device components to cause a visual effect on the image or improve energy harvesting, such as for different seasons. For example, the visual effect is three-dimensionality generated by the controller tilting the system through the actuator (e.g., an electric motor), thereby providing depth to the image at certain viewing angles. In this way, the system enhances the aesthetics of the solar cells for applications such as commercial advertising. Accordingly, the system generates enhanced aesthetics by displaying vivid images on solar cells for designated angles and directs solar rays toward the solar cells at other angles, thereby enhancing harvesting efficiency.

It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

Turning now to FIG. 1A, one embodiment of a system 100 having a lens that controls angles of light toward material that absorbs solar energy and sections having viewing material and reflective components is illustrated. A lens 102 may be a waveguide, film, etc. that optically controls incident light through transparent transmission toward the viewing material 104 and the solar cells 106. In one approach, the lens 102 is an acrylic material that improves the transmission of incident light by exhibiting enhanced transparency. Acrylic material also improves durability over glass that is vulnerable to cracking and scratches that decrease energy capture and vividness. Regarding controlling and directing the incident light, the lens 102 has certain angular ranges (e.g., bands) of the incident light 108 directed through a transparent path to the solar cells 106. Although the example in system 100 references solar cells, any material that absorbs solar or electromagnetic energy may be integrated with the lens 102 for displaying an image.

In the system 100, the solar cells 106 (e.g., silicon) may form a panel, layer, film, etc. that captures and absorbs solar energy for storing or powering a load. Furthermore, the lens 102 controls different angular ranges so that the incident light 110 travels to the viewing material 104. Such angular ranges may be referenced as image bands that define angles at which the image (e.g., a black and white image, a color image, etc.) is viewable by a person, machine, etc. For example, the viewing material mimics an object design, communicates a message, advertises information, etc. Accordingly, the system 100 improves the aesthetics of the solar cells 106 by displaying images at certain viewing angles and at other angles directly guiding solar rays toward the solar cells 106.

Moreover, the viewing material 104 may form an image within sections of a transparent material that attaches and aligns with the lens 102 through an adhesive that is optically clear. The viewing material 104 may also be pixels printed directly within sections (e.g., areas, grooves, cavities, etc.) of the lens 102 and then cured through thermal, light, and so on treatment such that the pixels form an image viewable within certain angular ranges and transparent otherwise. In other words, the pixels are transparent since the image is viewable within the certain angular ranges. Regarding materials, the viewing material 104 may be ink, organic ink, pigment, organic pigment, a structural color having ink, etc. having optimal reflective properties for improving visibility and clarity from a distance. In this way, the system 100 avoids having additional layers, sublayers, etc. between the lens 102 and solar cells 106 that reduce image clarity and light absorption through distorting incident light.

In the system 100, a configuration includes reflective components 112 adjacent to the viewing material 104 within the sections of the lens 102. Here, the reflective components 112 direct and control unreflected light when the viewing material 104 has transparent characteristics and may lack sufficient opaqueness. In one approach, the reflective components 112 reach ends (e.g., surfaces) of the lens 102 away from the incident light 108 that further prevents image distortions by containing light within the sections. For increasing vividness, the incident light 110 reflects off the viewing material 104 without unintentional scattering, thereby providing increased irradiation and image clarity. In one approach, the reflective components 112 are bright material (e.g., white) that insulates the incident light 110 from the solar cells 106 that is a darkened material (e.g., black, deep blue, etc.). In other words, an image formed by the viewing material 104 can be distorted by light absorbed from a color of the solar cells 106 that otherwise would irradiate the image. Therefore, brighter material reflects more incident light and reduces absorption by the solar cells 106, thereby improving image quality through reducing distortion.

Moreover, the reflective components 112 occupy the space per section without horizontally extruding and bleeding into the lens 102. As such, the system 100 prevents reduced harvesting efficiency and blurred images through physical properties having horizontal precision. In particular, the width of the reflective components 112 are kept congruent with the viewing material 104 through a controlled printing process that improves image sharpness.

Vertically, the reflective components 112 occupy the space per section at a ratio with the viewing material 104 that balances thinness. In one approach, the ratio has the viewing material 104 equal to or greater than the reflective components 112 for producing deeper colors. The ratio may also vary by each section for forming the image and exhibiting different visual effects. Similar to horizontal controls, the system 100 may maintain precision and reduce costs by printing within a limited number of passes (e.g., two, four, etc.) until satisfying parameters for opaqueness. For example, the parameter is that 99% of the incident light 110 reflects for irradiance instead of being absorbed by the solar cells 106. Accordingly, the system 100 improves reflectivity while avoiding ghosting from optical interference.

Regarding controlling the incident light, in various implementations, the lens 102 is a lenticular waveguide that controls and directs the transmission of the incident light. The lenticular waveguide may be an array of lenses allowing the viewing material 104 to be visible at certain angles and generate optical effects. For example, the lenticular waveguide gives an image depth at certain colors. In one approach, the lens 102 is a lenticular waveguide that wraps around pixels and attaches directly to the solar cells 106 at the ends of the lens 102. For this configuration, the system 100 has the pixels and the reflective components 112 directly printed onto the lenticular waveguide without adhesive or transparent sublayers for optical processing, thereby reducing thickness.

Regarding details about the solar cells 106, the ends of the lens 102 and reflective components 112 may coupled to the solar cells 106. For example, the lens 102 attaches through an adhesive that is optically clear for enhanced transparency that mitigates absorption losses for energy. In one approach, the solar cells 106 mechanically attach to the lens 102 with magnetic strips that readily allow detachability. Accordingly, the system is modular with magnetic strips that allow attaching new images for viewing on the solar cells 106.

Concerning performance, the system 100 displays reflective images on the solar cells 106 while retaining the majority of the incident light 108 and improving aesthetics. For example, the system 100 generates in excess of 90% reflectivity within a certain angular range using the reflective components 112 rather than 10% reflectivity. For energy harvesting, the system 100 can reach above 90% retention instead of 80% through other implementations. Although the lens 102 may be glass, efficiency is further increased through enhanced transparency when using acrylic, polymer, etc. materials for the lens 102. Therefore, the system 100 displays an image with the viewing material 104 that makes the solar cells 106 aesthetically pleasing and increases available installation areas, thereby increasing energy capture.

Still referring to FIG. 1A, in one approach, a controller 114 and an actuator 116 (e.g., motor) control orientation (e.g., tilt, angle, etc.) of the system 100 and generate image effects for the viewing material 104 associated with certain applications. Here, the actuator 116 is coupled to the unit 118 (e.g., a housing) that includes the lens 102, the viewing material 104, the solar cells 106, and the reflective components 112. Regarding power, the controller 114 can draw energy from the power system 120 that stores energy captured by the solar cells 106. Similarly, a device, building, etc. can draw stored power from the power system 120. Furthermore, the control may include tilting, shifting, etc. the unit 118 that causes image effects including three-dimensionality, darkness changes, contrast changes, color changes, etc. by changing the angular reflection of the incident light 110. In various implementations, the controller 114 and the actuator 116 improve energy harvesting by adapting the orientation of the system 100 through different seasons. For example, the actuator 116 tilts the system 100 ten degrees toward the equator during winter time for capturing additional light more directly. Accordingly, the controller 114 enhances the capabilities of the system 100 through motion that creates image effects and improves energy harvesting.

Figure 1B:
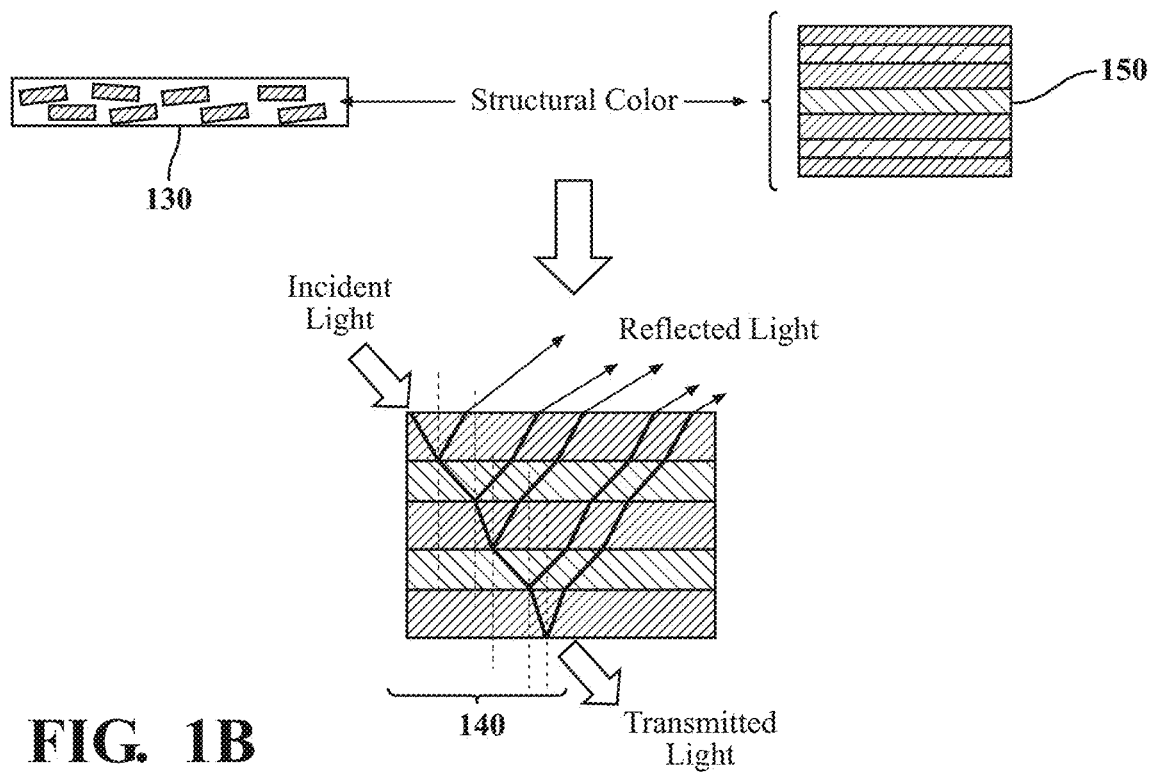
Figure 1C:
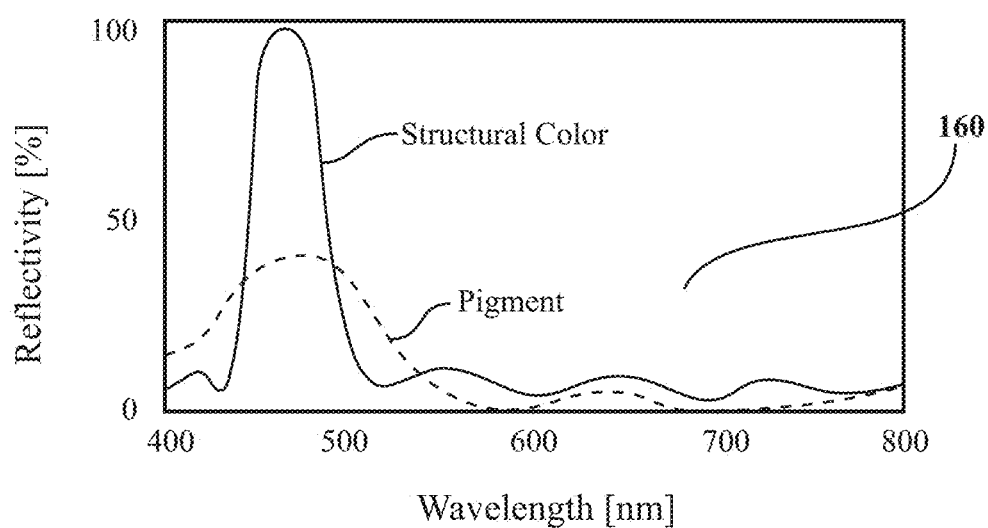

Now turning to FIGS. 1B and 1C, the system 100 may have the structural color 130 and ink as the viewing material 104 that creates vibrant images through enhanced reflectivity and precise chroma. One approach involves utilizing the structural color 130 including pigment stacks of layered materials 150 (e.g., $TiO_2$, silica, etc.) having varying refractive indices. The structural color 130 may have a flaky composition such that the flake orientation is manipulatable during printing to achieve a specific angular range for displaying vibrant images. Here, the layered materials 150 induce the controlled interference 140 that results in generating vivid colors. In particular, incident light behaves differently when traveling through the structural color 130. The layered materials 150 can make up film and surrounding media having refractive indices that distinctly generate the controlled interference 140. When incident light at a particular angle and wavelength passes through the layered materials 150, interference is created between light reflected from the upper and lower interfaces of the film. Multi-film interference arises from the periodic stacking of layer pairs, allowing the manipulation of multiple reflections at the interfaces and consequently enhancing the interference effects. In this way, the colors produced through multi-film interference are characterized by increased vividness, vibrancy, and saturation.

Moreover, the system 100 may incorporate a reflective layer (e.g., aluminum) at the center of the layered materials 150. In this way, the structural color 130 is tunable to a specific wavelength (i.e., visible color) on either side of a flake, regardless of flake orientation. In various implementations, the layered materials 150 include different materials with varying thicknesses. This allows adjusting the reflective and refractive properties of the layered materials 150 for tuning to specific wavelengths. Regarding dimensions, the structural color 130 can reduce the thickness and compactness of the system 100 by optimizing aspect ratios. For instance, the structural color 130 possesses lateral dimensions in the tens of micrometers range and a thickness in the hundreds of nanometers to a micrometer range. Consequently, the structural color 130, when compared to other pigments, covers similar areas (e.g., achieves 80% coverage) while utilizing a fraction of the material (e.g., at a concentration of 5% as opposed to 20% concentration), thereby resulting in reduced manufacturing costs.

In FIG. 1C, the structural color 130 is tuned to a blue color within a narrow wavelength range that may exhibit nearly 99% reflectivity. Here, the narrow wavelength range concentrates and focuses chroma that improves the vividness and clarity of an image. For example, pixels forming the image among the viewing material 104 avoid cross-color interference and bleeding. The narrow wavelength range also concentrates reflectivity that improves the vividness and clarity of the image, while the wavelengths beyond the narrow wavelength range are transmitted for energy harvesting. In addition to the structural color 130, as previously explained, the pigment 160 may be an organic ink implemented for the viewing material 104 that also exhibits increased reflectivity for the blue color at a different wavelength range. In one approach, the system 100 forms the viewing material 104 with the pigment 160 rather than the structural color 130 for cost budgeting associated with an application.

In various implementations, the system 100 has the layered materials 150 formed having angular properties (e.g., omnidirectional, directional, spherical, etc.) aligned with the lens 102. In this way, the incident light 110 that travels to the viewing material 104 having the structural color 130 has increased clarity and vividness from the increased reflectivity. In one approach, the angled properties of the structural color 130 also give images displayed by the system 100 different colors according to viewing angles. As another benefit, the structural color 130 (e.g., inorganic materials) improves the durability of the lens 102 and the exterior of the system 100 from having physical properties that tolerate heat and harsh weather. Therefore, the system 100 incorporating the structural color 130 with the viewing material 104 improves image vividness and reliability while increasing compactness.

Figure 2:
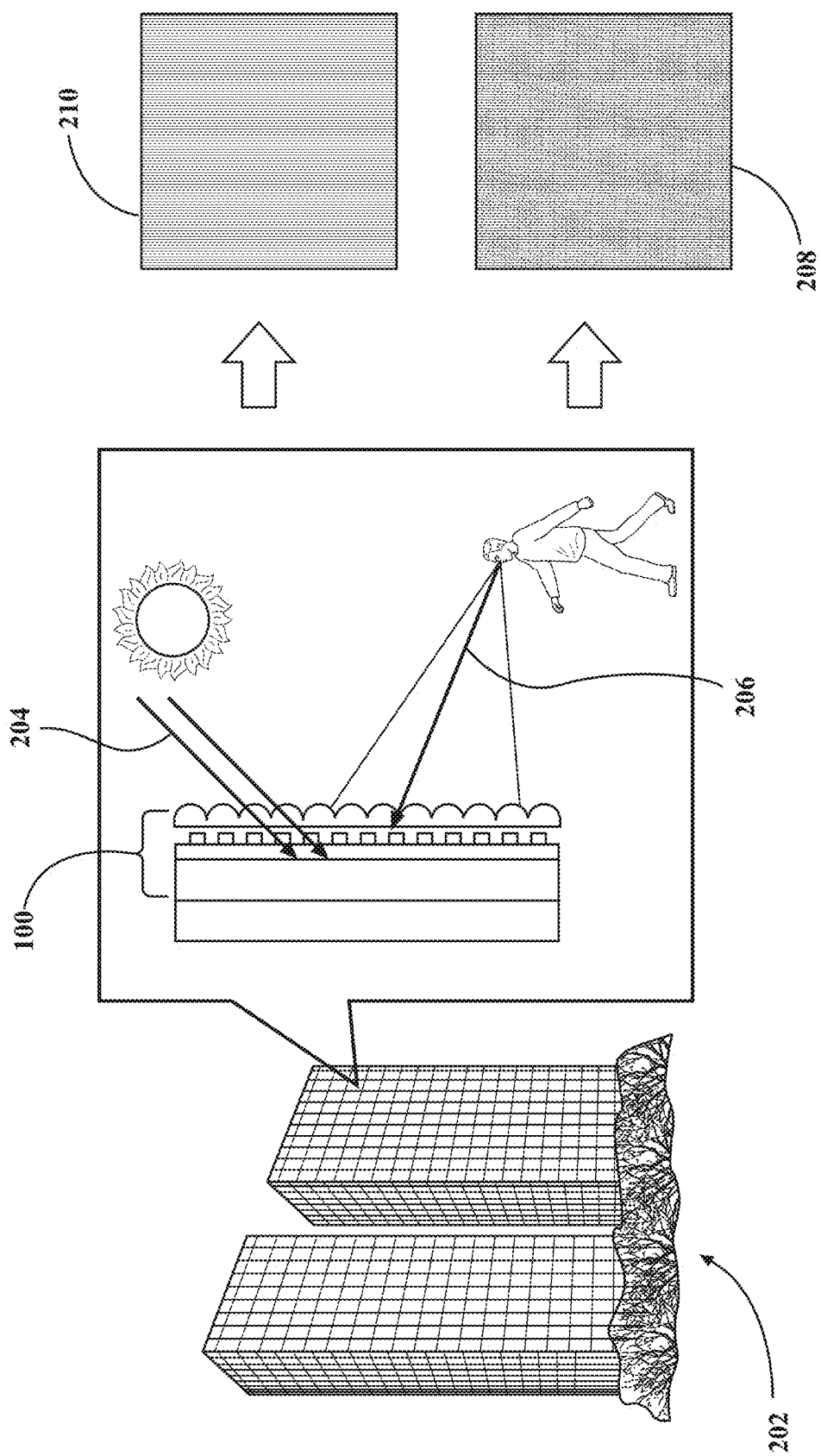
FIG. 2 illustrates an example of the system being integrated into a building for viewing an image while capturing solar energy.

Now turning to FIG. 2, an example of the system 100 being integrated into the building 202 for viewing an image while capturing solar energy is illustrated. Here, solar rays at incident angles 204 (e.g., 90-180 degrees) perpendicular to the building 202 are transmitted toward the solar cells 106 that are mounted vertically by diffusing through the lens 102. For this example, the system 100 displays a blue image 208 that mimics a façade at incident angles 206 (e.g., 0-90 degrees) from irradiation with reflected light. In other words, a pedestrian approaching the building 202 sees an image, whereas the solar cells directly absorb solar energy at the incident angles 204 through transparent transmission 210, thereby increasing capture efficiency. Besides mimicking an object design, the image may also communicate a message, advertise information, etc. In this way, the system 100 increases available installation areas of the solar cells 106 as the looks are palatable within a community. Accordingly, the system 100 improves the aesthetics of the building 202 without obstructing solar rays, thereby increasing efficiency and power capture.

Figure 3A:
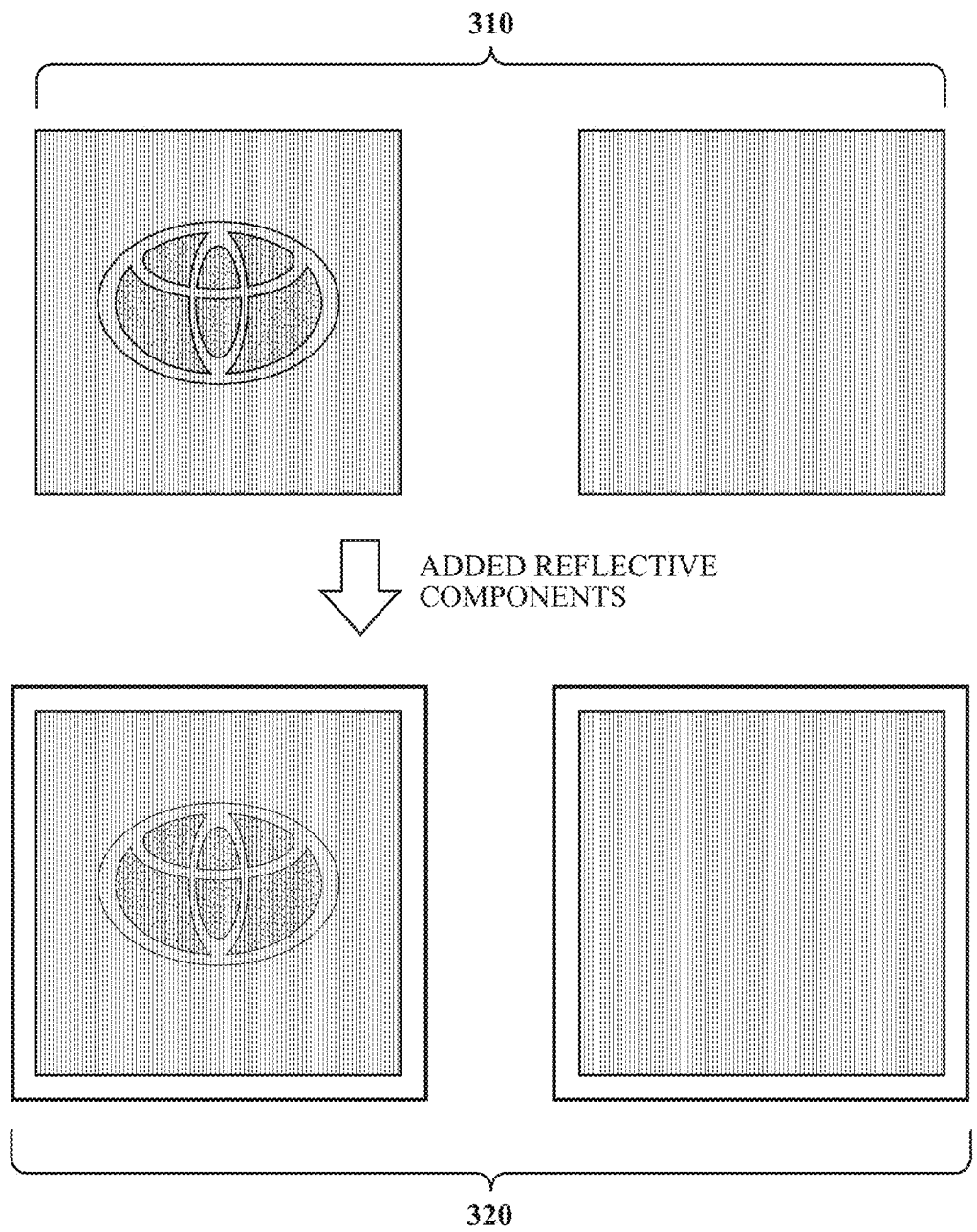
FIGS. 3A and 3B illustrate examples of the system having an image viewable at certain angles while being transparent at other angles and the system having a flexible form.

Regarding FIG. 3A, an example of the system 100 having an image viewable at certain angles while being transparent at other angles for capturing solar energy is illustrated. Here, the display 310 exhibits a blurred effect when viewed at certain angles without having the reflective components 112 implemented within the system 100. The display 320 includes reflective components 112 that display a sharper and vivid image when viewed at certain angles and exhibits transparency for other angles. As previously explained, the reflective components 112 may be a bright material (e.g., white) that insulates incident light from the solar cells 106 using darkened material (e.g., black). Thus, the images formed with the display 320 avoid distortion by light absorbed through the solar cells 106 and instead irradiate the incident light.

Figure 3B:
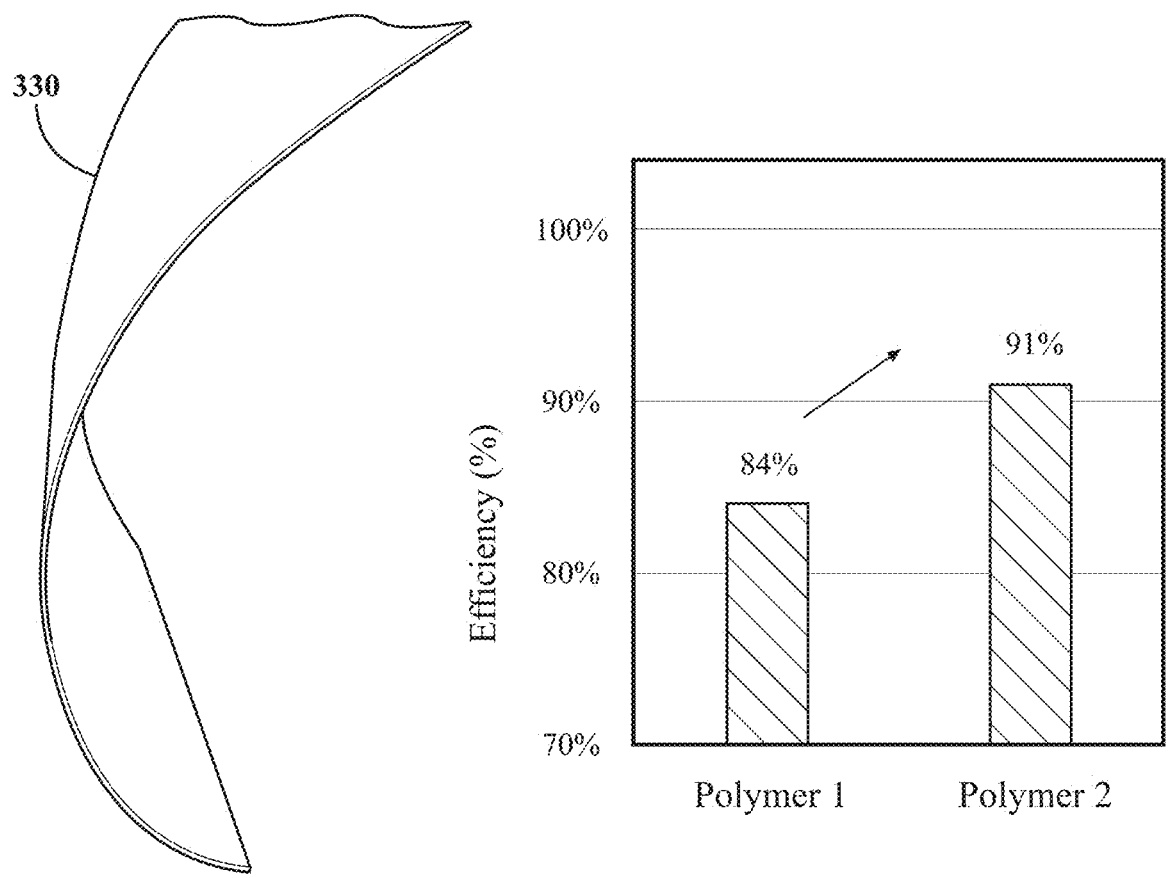

In FIG. 3B, the system 100 includes flexible substrates and materials for the solar cells 106 and the lens 102. For example, the lens 102 is a lenticular lens formed by an acrylic material that is microns thick, thereby allowing flexibility and reducing weight. In display 330, the system 100 is flexible and curves up to 45 degrees. In other implementations, the system is flexible up to a curvature of 360 degrees that allows forming a shape for increasing installation options. For instance, the flexibility of the system 100 allows installation on curved roofs, shading canopies, building components, lightposts, automobile panels, automobile rooftops, etc. such that an image is viewable at certain angles while solar rays are unobstructed toward the solar cells 106 at other angles.

Moreover, in one approach, the system 100 displays an image when the display 330 is curved and transparent when the display 330 is made flatter. For example, the controller 114 and the actuator 116 (e.g., a motor) force and shape the display 330 to a 45-degree angle and display an advertisement that is viewable from 270 degrees while allowing the system 100 to still capture energy. Subsequently, the controller 114 and the actuator 116 flatten the display 330 that makes the image transparent and increases energy capture. Regarding harvesting efficiency, the display 330 may retain over 90% absorption through increased and controlled reflectivity from the reflective components 112 or structural color 130. In one approach, since the curvature of the display 330 may effect absorption by the solar cells 106, the display 330 is curved until the harvesting efficiency falls below a threshold. Therefore, the system 100 adapts physical form for curved applications with flexible substrates and materials while efficiently capturing energy, thereby expanding installation options.

Figure 4:
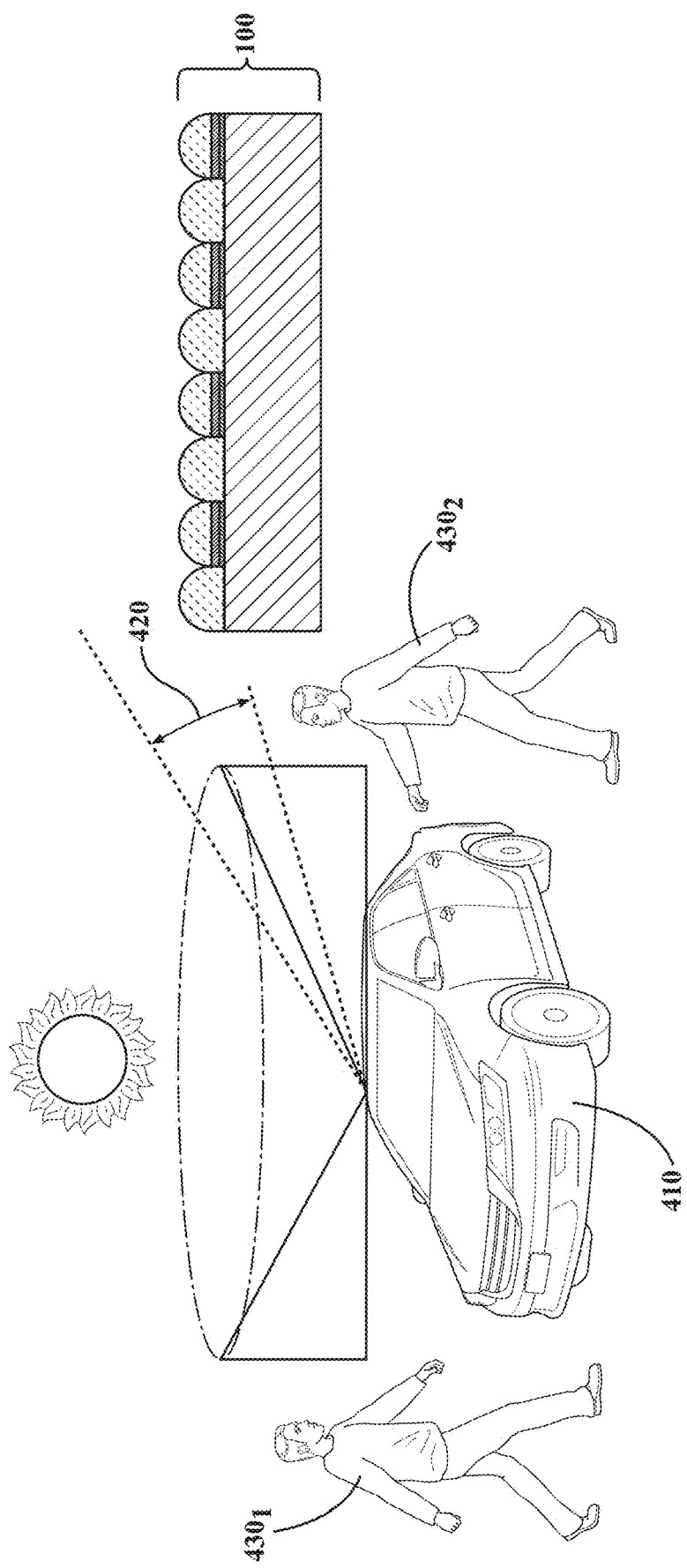
FIG. 4 illustrates an example of the system being integrated into a vehicle for viewing an image while capturing solar energy.

Now turning to FIG. 4, an example of the system 100 being integrated into a vehicle 410 for viewing an image while capturing solar energy is illustrated. A vehicle may be any form of motorized transport including an automobile. In FIG. 4, the system 100 is integrated into the roof or top of the vehicle 410 for having an increased installation area, thereby capturing sufficient energy to power vehicle systems. Here, the lens 102 may be a lenticular lens that is spherical. As such, solar rays at incident angles 420 (e.g., 45-180 degrees) and certain heights form a cone represented by spherical coordinates on the vehicle 410. The solar rays at the incident angles 420 are transmitted toward the solar cells 106 that are mounted horizontally by diffusing through the lens 102. Although the example in system 100 references solar cells, any material that absorbs solar or electromagnetic energy may be integrated with the lens 102 and the vehicle 410 for displaying an image.

Moreover, the system 100 displays an image at other angles on a plane in 360 degrees around the vehicle 410 from irradiation through reflected light. Here, the image may mimic a vehicle top as a solid color that matches the vehicle body. Furthermore, the top may include a sunroof, aerodynamic contours, and other features that correspond to a design of the vehicle 410. As such, pedestrians 4301 and 4302 approaching the vehicle 410 see the image, whereas the solar cells 106 directly absorb solar energy at the incident angles 420 through transparent transmission, thereby increasing capture efficiency. Therefore, the system 100 increases energy capture and applications for the solar cells 106 by improving aesthetics through displaying images in various vehicle environments and installations.

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-4, but the embodiments are not limited to the illustrated structure or application.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC or ABC).

Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:
   a lens that directs incident light within a first angular range for absorption and a second angular range toward viewing material;
   the viewing material is within sections of the lens and forms an image;
   reflective components that are adjacent to the viewing material within the sections of the lens, the reflective components positioned away from the incident light and reflect the incident light within the second angular range that reflects off the viewing material; and
   an absorption component that captures energy from the incident light, the absorption component coupled to the lens and the reflective components, wherein the lens and the absorption component are composed of a flexible material.

2. The system of claim 1, wherein:
   the lens isolates the incident light between the first angular range and the second angular range by wrapping around the viewing material and the reflective components until reaching a surface associated with the lens, and the sections are one of grooves, cavities, and flat surfaces associated with the lens.

3. The system of claim 2, wherein the image on the viewing material is unviewable within the first angular range and visible within the second angular range.

4. The system of claim 1 further comprising:
   a power system that stores the energy, the power system coupled to a controller;
   an actuator coupled to the absorption component, the lens, and the controller;
   the controller signals the actuator to shift the absorption component and the lens that causes a visual effect on the image; and
   the controller draws power for the actuator from the power system.

5. The system of claim 1 further comprising:
   the lens is a spherical lens; and
   the first angular range is greater than the second angular range for horizontal mounts in spherical coordinates associated with the spherical lens.

6. The system of claim 1, wherein the first angular range is equal to or greater than the second angular range for vertical mounts and the viewing material is thicker than the reflective components within each of the sections.

7. The system of claim 1, wherein:
   the lens and the absorption component curve to form a shape that displays the image, and the image is viewable when in the shape.

8. The system of claim 1, wherein the absorption component has solar cells that attach to the lens with magnetic strips that allow detachability between the solar cells and the lens.

9. The system of claim 1, wherein the lens is an acrylic material that directs the incident light, the absorption component directly attaches to the lens with an adhesive that is optically clear, and the absorption component forms a curved shape.

10. The system of claim 1 further comprising:
the viewing material being a pigment having structural color tuned to wavelengths on a visible spectrum through interference of the incident light, and the structural color has layers of varying thickness and material for concentrated reflectivity at the wavelengths; and
the pigment forms pixels to display the image.

11. A system comprising:
a lenticular waveguide as a lens that directs incident light within a first angular range for absorption and a second angular range toward viewing material;
the viewing material is printed within sections of the lenticular waveguide and forms an image;
reflective components that are printed adjacent to the viewing material within the sections of the lenticular waveguide, the reflective components proximate to the lenticular waveguide away from the incident light and reflect the incident light within the second angular range that illuminates the image; and
an absorption component that captures energy from the incident light, the absorption component attached to the lenticular waveguide and the reflective components, wherein the lenticular waveguide and the absorption component are composed of a flexible material.

12. The system of claim 11, wherein:
the lenticular waveguide isolates the incident light between the first angular range and the second angular range by wrapping around the viewing material and the reflective components until reaching ends associated with the lenticular waveguide, and the sections are one of grooves, cavities, and flat surfaces associated with the lenticular waveguide.

13. The system of claim 12, wherein the image on the viewing material is unviewable within the first angular range and visible within the second angular range.

14. The system of claim 11 further comprising:
a power system that stores the energy, the power system coupled to a controller;
an actuator coupled to the absorption component, the lenticular waveguide, and the controller;
the controller signals the actuator to shift the absorption component and the lenticular waveguide that causes a visual effect on the image, wherein the visual effect is one of three-dimensionality, darkness changes, contrast changes, and color changes; and
the controller draws power for the actuator from the power system.

15. The system of claim 11 further comprising:
the lenticular waveguide is a spherical lens; and
the first angular range is greater than the second angular range for horizontal mounts in spherical coordinates associated with the spherical lens.

16. The system of claim 11, wherein the first angular range is equal to or greater than the second angular range for vertical mounts and the viewing material is thicker than the reflective components within each of the sections.

17. The system of claim 11, wherein:
the lenticular waveguide and the absorption component curve to form a shape that displays the image, and the image is viewable when in the shape.

18. The system of claim 11 further comprising:
the viewing material being a pigment having structural color tuned to wavelengths on a visible spectrum through interference of the incident light, and the structural color has layers of varying thickness and material for concentrated reflectivity at the wavelengths and the layers cause the interference; and
the pigment forms pixels to display the image.

19. The system of claim 11, wherein the lenticular waveguide is an acrylic material that directs the incident light, the absorption component directly attaches to the lenticular waveguide with an adhesive that is optically clear, and the absorption component forms a curved shape.

20. A system comprising:
a lenticular waveguide that directs incident light within a first angular range for absorption and a second angular range toward viewing material;
the viewing material is within sections of the lenticular waveguide and forms an image;
reflective components that are next to the viewing material within the sections of the lenticular waveguide, the reflective components located away from the incident light and the lenticular waveguide, and reflect the incident light within the second angular range that reflects off the viewing material; and
an absorption component that captures energy from the incident light, the absorption component is fixed to the lenticular waveguide and the reflective components with an optical adhesive, wherein the lenticular waveguide and the absorption component are composed of a flexible material.

* * * * *